Patented Nov. 17, 1936

2,061,121

UNITED STATES PATENT OFFICE 2,061,121

BAKED GOODS AND PROCESS OF MAKING SAME

Verling M. Votaw and Herbert S. Coith, Wyoming, Ohio, assignors to The Procter & Gamble Company, Cincinnati, Ohio, a corporation of Ohio No Drawing. Application October 3, 1932, Serial No. 636,014

15 Claims. (Cl. 99—92)

Our invention relates to baked goods containing flour and shortening, and to the process of making same. More specifically, our invention relates to improved baked products in which part of the usual shortening is replaced by free fatty acid of edible grade.

The main object of our invention is to produce baked products of improved appearance and eating qualities, particularly with respect to a uniform, tender texture.

Our invention is applicable particularly but not exclusively to baked products containing sugar, and usually also a chemical leavening agent, as well as flour and shortening. Cakes made as disclosed in the present invention have unusually light texture, their increased volume as compared with cakes made in the usual way being of considerable commercial advantage in bakery practice. Production of cakes of light texture and correspondingly large volume has heretofore been particularly difficult in the case of cakes of relatively high sugar content, for example those containing a quantity of sugar more than 100% of the weight of the flour present. According to our invention, cakes containing even 50 or 75 per cent more sugar than flour are readily produced without sacrifice of the light, tender texture generally desired in the finished product. Such cakes are very pleasing on account of their unusually soft, smooth, and moist eating quality, as well as on account of their sweetness and volume.

According to our invention, we obtain baked products of the improved quality just described by incorporating at some point in the mixing procedure a suitable quantity of free fatty acid of edible grade. This free fatty acid replaces a portion, preferably between 2 and 10 per cent, of the usual shortening. However, our invention is not limited to this preferred range of composition. Appreciable improvement can be obtained in baked products by substituting less than 2 per cent of the usual shortening with free fatty acid, and marked improvement can be obtained by substituting more than 10 per cent. We prefer not to use free fatty acid in greater amount than is required to replace about 10 per cent of the usual shortening, because this amount is sufficient to permit the production of baked products, even cakes containing substantially more sugar than flour, of such excellent quality that any further improvement by the use of more free fatty acid would be a matter of small importance.

Any of the common cooking fats may constitute the major portion of the shortening used in the practice of our invention. We prefer to use a plastic or semi-solid shortening, for example, lard, butter or partially hydrogenated cottonseed oil. Also we prefer that this shortening of the usual type be of very low free fatty acid content, a fact which in no way is inconsistent with the distinctive features of the present invention. It so happens that the established methods of production, transporting, storing and processing edible fats are such that the production of a commercial edible fat of good color, flavor, odor and stability has necessarily resulted also in a fat of low free fatty acid content. Particularly is this true in the case of the shortening agents prepared from alkali refined animal fats and vegetable oils, and of shortening which has been deodorized with steam under vacuum. Hence, in the practice of our invention, that portion of the shortening which is of the conventional type is preferably very low in free fatty acid, and the required free fatty acid should be supplied in accordance with special precautions, as explained below.

The free fatty acid suitable for use in accordance with the present invention should be derived predominantly from fatty acids having 16 or more carbon atoms in their molecular formula. Both saturated and unsaturated fatty acids are of value, but we prefer predominantly unsaturated fatty acids for best results. Fatty acids of coconut oil and similar oils have an undesirable flavor and should not be used in substantial amount. As is well known, butter fatty acids also have an undesirable flavor. The ordinary fatty acids of 16 or higher carbon content in their molecular formula are practically odorless, and do not have a pronounced flavor. Suitable fatty acids may be made by alkali saponification of common fats already processed so as to be of edible grade, such as lard, peanut oil or hydrogenated cottonseed oil, and by treatment of the resulting soap with mineral acid. These reactions may be carried out according to well-known methods. During processing, and thereafter, it is desirable that contact of the free fatty acid with air be avoided or kept to the practical minimum, for instance, by the use of tight containers and by use of an inert gas, such as nitrogen.

In the foregoing, the free fatty acid has been considered as a separate ingredient added to the mix to be baked, and this procedure gives excellent results. However, our invention may also be practiced, by premixing the free fatty acid, according to convenience, with any of the other ingredients, or any combination thereof, for instance, the ingredients mentioned in Examples 1, 2 and 3 herein, or other ingredients suitable for use in baked goods, such as dried milk powder or dried eggs. In particular, it may be convenient to premix the free fatty acid with the larger quantity of regular shortening. The mixture of free fatty acid and neutral fat may also be prepared directly or indirectly by partial hydrolysis of edible fat, with precaution against excessive exposure to atmospheric oxidation, so as to safeguard the quality of the fat. These shortenings, containing added free fatty acid or free fatty acid derived by chemical reaction from a part of the neutral fat, are not claimed as such in the present invention, but are further described and claimed in our copending application, Serial Number 636,016, filed concurrently herewith.

Following are cake recipes illustrating our invention:

Example 1

|  | Pounds | Ounces |
| --- | --- | --- |
| Sugar | 1 | 1⅝ |
| Salt | 0 | ⅝ |
| Cake flour | 1 | 0 |
| Baking powder | 0 | ⅝ |
| Hydrogenated cottonseed oil of 66 iodine value containing 2% free fatty acid derived from similar fat | 0 | 6⅛ |
| Milk | 0 | 11⅞ |
| Egg whites | 0 | 7⅞ |

All of the ingredients with the exception of the egg whites are placed in the bowl of a mixing machine, for example a Hobart mixer, and mixed at slow speed for 7 minutes. The egg whites are then added and the mixing continued for 7 minutes at slow speed. A temperature of 375° F. is used in baking the cakes.

Example 2

|  | Pounds | Ounces |
| --- | --- | --- |
| Sugar | 1 | 7 |
| Salt | 0 | ½ |
| Cake flour | 1 | 0 |
| Baking powder | 0 | ¾ |
| Butter | 0 | 7½ |
| Free fatty acid derived from hydrogenated cottonseed oil of 66 iodine value | 0 | ½ |
| Milk | 0 | 15 |
| Egg whites | 0 | 10 |

The mixing is carried out in the same way as in Example 1.

Example 3

|  | Pounds | Ounces |
| --- | --- | --- |
| Sugar | 1 | 4 |
| Salt | 0 | ⅝ |
| Cake flour | 1 | 0 |
| Baking powder | 0 | ¾ |
| Lard containing 4% free fatty acid derived from similar fat | 0 | 7 |
| Milk | 0 | 10½ |
| Egg whites | 0 | 10 |

The mixing is carried out in the same way as in Example 1.

We claim:

1. In the process of making cakes containing more sugar than flour and containing shortening, the step which comprises incorporating in the mix free fatty acid of molecular formula containing predominantly not fewer than 16 carbon atoms, the amount of free fatty acid being not substantially less than 2% of the total weight of the shortening employed and being sufficient to increase substantially the volume of the cakes after baking as compared with similar cakes containing the same shortening without added free fatty acid.

2. In the process of making cakes containing more sugar than flour and containing shortening, the step which comprises incorporating in the mix free fatty acid derived from a predominantly unsaturated edible fat, the amount of free fatty acid being not substantially less than 2% of the total weight of the shortening employed and being sufficient to increase substantially the volume of the cakes after baking as compared with similar cakes containing the same shortening without added free fatty acid.

3. In the process of making cakes containing more sugar than flour, the step which comprises incorporating in the mix both substantially neutral fat and an amount of free fatty acid between 2 and 10% of the total fatty matter present, said fatty acid being predominantly of molecular formula containing at least 16 carbon atoms and being employed in amount sufficient to increase substantially the volume of the cakes after baking as compared with similar cakes containing the same shortening without added free fatty acid.

4. In the process of making cakes containing more sugar than flour, the step which comprises incorporating in the mix a cooking fat to which has been added free fatty acid of molecular formula predominantly of 16 and higher carbon content, the amount of the free fatty acid being sufficient to increase substantially the volume of the cakes after baking as compared with similar cakes containing the same shortening without added free fatty acid.

5. In the process of making cakes containing more sugar than flour, the step which comprises incorporating in the mix edible fat derived predominantly from fatty acids having not fewer than 16 carbon atoms per molecule which has been processed in such a manner as to convert a portion of the said fat to free fatty acid, the amount of free fatty acid thus formed being sufficient to increase substantially the volume of cakes after baking as compared with similar cakes containing shortening not processed so as to increase the fatty acid content.

6. Cakes containing more sugar than flour and containing shortening comprising neutral fat and added free fatty acid of molecular formula containing predominantly at least 16 carbon atoms, the amount of the free fatty acid being sufficient to increase substantially the volume of the cakes after baking as compared with similar cakes containing the same shortening without added free fatty acid.

7. Cakes containing more sugar than flour and containing predominantly unsaturated shortening processed in such manner as to convert a portion of the neutral fat to free fatty acid, the amount of free fatty acid thus formed being sufficient to increase substantially the volume of cakes after baking as compared with similar cakes containing shortening not processed so as to increase the fatty acid content.

8. In the process of making cakes containing flour, sugar in amount exceeding the amount of flour, shortening, and a chemical leavening agent, the step which comprises incorporating in the mix free fatty acid derived from a partially hydrogenated edible fat, said fatty acid being predominantly of molecular formula containing at least 16 carbon atoms, the amount of free fatty acid being not substantially less than 2% of the total weight of the shortening employed and being sufficient to increase substantially the volume of the cakes after baking as compared with similar cakes containing the same shortening without added free fatty acid.

9. In the process of making cakes containing flour, sugar in amount exceeding the amount of flour, shortening, and a chemical leavening agent, the step which comprises incorporating in the mix a shortening of lard-like to solid consistency consisting of neutral fat and added free fatty acid of molecular formula containing predominantly at least 16 carbon atoms, the amount of the free fatty acid being sufficient to increase substantially the volume of the cakes after baking as compared with similar cakes containing the same shortening without added free fatty acid.

10. In the process of making cakes containing flour, sugar in amount exceeding the amount of flour, shortening, and a chemical leavening agent, the step which comprises incorporating in the mix a shortening of lard-like to solid consistency containing a quantity of fatty acid between 2% and 10% of the total shortening, said fatty acid being predominantly of molecular formula containing at least 16 carbon atoms and being employed in amount sufficient to increase substantially the volume of the cakes after baking as compared with similar cakes containing the same shortening without added free fatty acid.

11. In the process of making cakes containing flour, sugar in amount exceeding the amount of flour, shortening, and a chemical leavening agent, the step which comprises incorporating in the mix a substantially dry shortening agent containing added free fatty acid of molecular formula containing predominantly at least 16 carbon atoms, the amount of the free fatty acid being sufficient to increase substantially the volume of the cakes after baking as compared with similar cakes containing the same shortening without added free fatty acid.

12. In the process of making cakes containing flour, sugar in amount exceeding the amount of flour, shortening, and a chemical leavening agent, the step which comprises incorporating in the mix a substantially dry shortening agent containing 2% to 10% free fatty acid based on the total weight of shortening in the mix, said fatty acid being predominantly of molecular formula containing at least 16 carbon atoms and being employed in amount sufficient to increase substantially the volume of the cakes after baking as compared with similar cakes containing the same shortening without added free fatty acid.

13. A process of making cakes of high sugar content which comprises incorporating a shortening of lard-like consistency comprising added free fatty acid, predominantly of molecular formula containing not less than 16 carbon atoms, in a mix containing flour and a greater quantity of sugar than flour, the amount of the free fatty acid being sufficient to increase substantially the volume of the cakes after baking as compared with similar cakes containing the same shortening without added free fatty acid.

14. Cakes containing more sugar than flour and containing shortening consisting essentially of 90% to 98% neutral fat and 2% to 10% free higher fatty acid, the amount of fatty acid employed being sufficient to increase substantially the volume of the cakes after baking as compared with similar cakes containing the same shortening without added free fatty acid.

15. A process of making cakes of high sugar content which comprises incorporating a free fatty acid predominantly of molecular formula containing not less than 16 carbon atoms in a mix containing flour, shortening, and a greater quantity of sugar than flour, the amount of free fatty acid being not substantially less than 2% of the total weight of the shortening employed and being sufficient to increase substantially the volume of the cakes after baking as compared with similar cakes containing the same shortening without added free fatty acid.

VERLING M. VOTAW.
HERBERT S. COITH.